(12) United States Patent
Milne et al.

(10) Patent No.: US 9,140,871 B2
(45) Date of Patent: Sep. 22, 2015

(54) OPTICAL FIBER CARRIER

(71) Applicant: CHRISTIE DIGITAL SYSTEMS USA, INC., Cypress, CA (US)

(72) Inventors: Dennis Milne, Cambridge (CA); Michael Bishop, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 345 days.

(21) Appl. No.: 13/710,711

(22) Filed: Dec. 11, 2012

(65) Prior Publication Data

US 2014/0161403 A1 Jun. 12, 2014

(51) Int. Cl.
*G02B 6/44* (2006.01)

(52) U.S. Cl.
CPC ................... *G02B 6/4452* (2013.01)

(58) Field of Classification Search
CPC ........................................... G02B 6/444
See application file for complete search history.

(56) References Cited

U.S. PATENT DOCUMENTS

| 6,829,452 | B2 | 12/2004 | Barthel et al. |
| 7,677,400 | B2 * | 3/2010 | Bayazit et al. ................... 211/26 |
| 2007/0230887 | A1 | 10/2007 | Vongseng |
| 2010/0158466 | A1 | 6/2010 | Cassidy et al. |

FOREIGN PATENT DOCUMENTS

| WO | 95/07484 A1 | 3/1995 |
| WO | 00/07053 A2 | 2/2000 |
| WO | 01/31380 A1 | 5/2001 |

OTHER PUBLICATIONS

Corresponding European Patent Application No. 13196379.5 Search Report dated Mar. 21, 2014.

* cited by examiner

*Primary Examiner* — Uyen Chau N Le
*Assistant Examiner* — John M Bedtelyon
(74) *Attorney, Agent, or Firm* — Perry + Currier, Inc.

(57) ABSTRACT

An optical fiber carrier is provided, for routing given optical fibers from a bundle of the given optical fibers, the given optical fibers having a given minimum bend radius, the optical fiber carrier comprising: a planar surface comprising vertical edges; downwards curved rungs projecting from the planar surface and vertically aligned between the vertical edges, each of the downwards curved rungs peaking in an upward direction, and comprising a respective radius that is greater than or equal to the given minimum bend radius; and exit conduits located at the vertical edges, respective exit conduits located between respective adjacent downwards curved rungs, the downwards curved rungs and the exit conduits for routing an excess of each of the given optical fibers from the bundle, guided by one or more of the downwards curved rungs, and through one of the exit conduits.

18 Claims, 11 Drawing Sheets

OPTICAL FIBER CARRIER

FIELD

The specification relates generally to optical fibers, and specifically to an optical fiber carrier.

BACKGROUND

Using optical fibers to convey light from a source to a destination presents a number of handling challenges. First they are manufactured with specialized coatings on both the input and output end face so the optical fiber can't be cut to length at installation. Second, the optical fibers minimum bend radius must be protected: in other words, if the optical fiber is bent tighter than approximately 200 times its cladding diameter it could be damaged. The combination of these two limitations makes optical fiber routing difficult. The difficulty of managing extra optical fiber length is increased by optical fiber length manufacturing tolerance: for example, optical fibers are not manufactured to an accurate length so the amount of extra optical fiber length varies from one installation to the next.

SUMMARY

An aspect of the specification provides an optical fiber carrier for routing given optical fibers from a bundle of the given optical fibers, the given optical fibers having a given minimum bend radius, the optical fiber carrier comprising: a planar surface comprising vertical edges; downwards curved rungs projecting from the planar surface and vertically aligned between the vertical edges, each of the downwards curved rungs peaking in an upward direction, and comprising a respective radius that is greater than or equal to the given minimum bend radius; and exit conduits located at the vertical edges, respective exit conduits located between respective adjacent downwards curved rungs, the downwards curved rungs and the exit conduits for routing an excess of each of the given optical fibers from the bundle, guided by one or more of the downwards curved rungs, and through one of the exit conduits.

A pitch of the downwards curved rungs can be one or more of: between about 30 mm and 60 mm; less than about 100 mm; and less than about 200 mm.

The optical fiber carrier can further comprise at least one outer vertical channel along at least one of the vertical edges, the at least one outer vertical channel enabled to accept the bundle of the given optical fibers.

The optical fiber carrier can further comprise at least one fiber breakout mount in the at least one outer vertical channel enabled to hold a fiber breakout of the bundle, wherein a greater a distance of a given downwards curved rung from the at least one fiber breakout mount, a greater an excess of the given optical fibers the given downwards curved rung can route. The optical fiber carrier can further comprise one or more of a cutout and an aperture in the planar surface beneath the at least one fiber breakout mount for receiving the bundle of the given optical fibers from a rear side of the planar surface. The optical fiber carrier can further comprise at least three fiber breakout mounts in the at least one outer vertical channel, each of the at least three fiber breakout mounts enabled to hold a respective fiber breakout of each of three optical fiber bundles. The at least one outer vertical channel is enabled to one or more of guide the bundle of the given optical fibers; mount the bundle of the given optical fibers; and guide the given optical fibers to the downwards curved rungs.

The optical fiber carrier can further comprise at least one inner vertical channel, adjacent at least one outer vertical channel, enabled to guide the given optical fibers from a given downwards curved rung to one or more of a further downwards curved rung and one of the exit conduits. The at least one inner vertical channel can be formed by first projections from the planar surface and second projections from the planar surface, the second projections adjacent the outer vertical channel. The first projections can comprise at least one edge forming a first side of the at least one inner vertical channel, the at least one edge for a respective first projected located along a radius of one of the downward curved rungs to assist in maintaining the given minimum bend radius of the given optical fibers when looped around the one of the downward curved rungs. The at least one edge can be further enabled to guide the given optical fibers from the downwards curved rungs to the at least one inner vertical channel. The at least one outer vertical channel can be formed by the second projections and third projections from the planar surface, the third projections forming the exit conduits.

The optical fiber carrier can further comprise upwards curved rungs paired with the downward curved rungs in a one-to-one relationship and aligned therewith, each of the upwards curved rungs comprising a same respective radius as the downwards curved rungs, each respective upwards curved rung located beneath a respective downwards curved rung. A distance between a peak of a given downwards curved rung and a bottom of a given upwards curved rung, associated with another downwards curved rung located beneath the given downwards curved rung, is greater than or equal to about twice the minimum bend radius. Pairs of the downwards curved rungs and upwards curved rungs can be in the shape of one or more of an ellipse, an oval, a pointed ellipse, a pointed oval, a mandorla, an intersection of two circles, and a vesica piscis.

The downwards curved rungs can be formed by one or more of at least one edge of a solid projection, a respective solid projection comprising a respective downwards curved rung and a respective upwards curved rung; a ridge; and, a plurality of pins.

The optical fiber carrier can further comprise respective guide conduits horizontally aligned with respective exit conduits, and each of the respective guide conduits can be located between respective horizontal ends of adjacent downwards curved rungs. The optical fiber carrier can further comprise projections from the planar surface forming the respective guide conduits, an outer edge of each of the projections located along a radius of one of the downward curved rungs to assist in maintaining the given minimum bend radius of the given optical fibers when looped around the one of the downward curved rungs, the outer edge further enabled to assist in guiding the given optical fibers from a given downwards curved rung to an inner vertical channel.

The optical fiber carrier can further comprise flanges for preventing the given optical fibers from sliding off a respective downwards curved rung when the optical fiber carrier is installed in a vertical orientation.

The optical fiber carrier can further comprise a hanger portion extending from an upper edge of the planar surface, the hanger portion being curved at a radius that is about greater than or equal to the given minimum bend radius such that the bundle can be hung over the hanger portion to detangle the given optical fibers. The optical fiber carrier can further comprise one or more fiber breakout mounts adjacent the upper edge for holding a fiber breakout of the bundle while the given optical fibers are being detangled.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
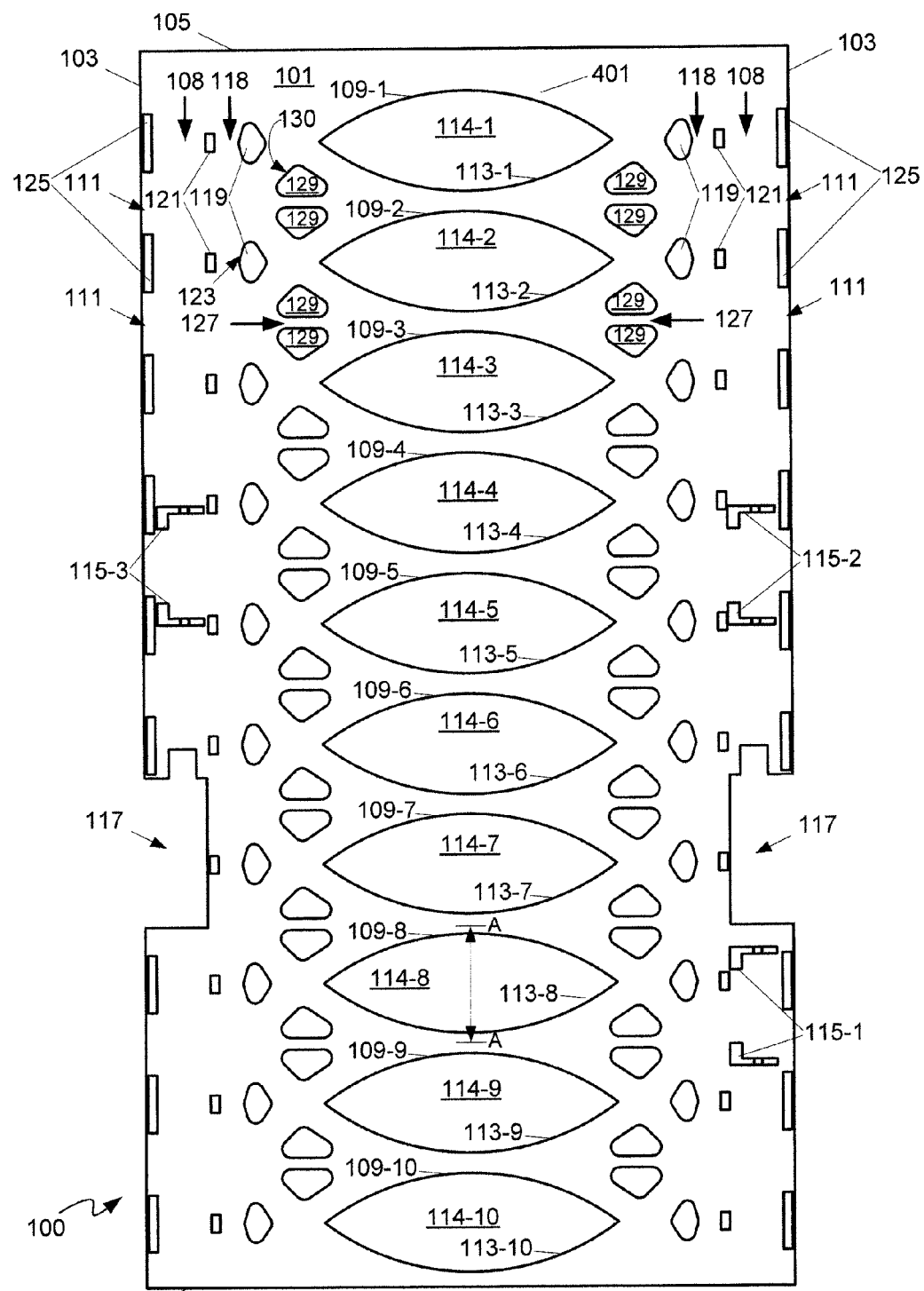
FIG. 1 depicts an optical fiber carrier, according to non-limiting implementations.

FIG. 1 depicts a front perspective view of an optical fiber carrier 100, according to non-limiting implementations, also interchangeably referred to hereafter as carrier 100. Carrier 100 is generally enabled for routing given optical fibers from a bundle of the given optical fibers, the given optical fibers having a given minimum bend radius, as will presently be explained. Carrier 100 comprises a planar surface 101 comprising opposing vertical edges 103, a top edge 105 and a bottom edge 107. Carrier 100 further comprises at least one outer vertical channel 108 along at least one of the vertical edges 103, the at least one outer vertical channel 108 for accepting a bundle of given optical fibers. It is appreciated that, in some implementers, at least one vertical channel 108 is optional. Carrier 100 further comprises downwards curved rungs 109-1, 109-2, 109-3, 109-4, 109-5, 109-6, 109-7, 109-8, 109-9, 109-10. Downwards curved rungs 109-1, 109-2, 109-3, 109-4, 109-5, 109-6, 109-7, 109-8, 109-9, 109-10 will also be interchangeably referred to hereafter, collectively, as downwards curved rungs 109 and, generically, as a downwards curved rung 109. Downwards curved rungs 109 project substantially perpendicularly from planar surface 101 and are vertically aligned between vertical edges 103. It is appreciated that the term "downwards curved" can mean that each downwards curved rung 109 generally peaks in an upward direction. Further, each of the downwards curved rungs 109 comprise a respective radius that is greater than or equal to the given minimum bend radius.

Further, in order to provide space for both a loop of the given optical fiber that has been looped to the given minimum radius around one or more of downwards curved rungs 109, vertical channels 108, a span between vertical edges 103 (i.e. a width of carrier 100) is about 2.9 times the given minimum bend radius. However, the span between vertical edges could be as low as about 2.7 times the given minimum bend radius. For example, a 400 µm diameter optical fiber with a 440 µm cladding outer diameter would have a minimum bend radius of about 88 mm, and hence the span between vertical edges for this optical fiber would be about 255 mm, or about 2.9 times 88 mm.

Carrier 100 further comprises exit conduits 111 located at vertical edges 103, respective exit conduits 111 located on a centre line between respective adjacent downwards curved rungs 109. In general, downwards curved rungs 109 and exit conduits 111 are for routing an excess of each of the given optical fibers from the bundle, guided by one or more of downwards curved rungs 109, and through one of exit conduits 111 to, for example, at least one external connector, as will presently be described.

It is further appreciated that while implementations of carrier 100 in FIG. 1 comprise sixteen exit conduits 111, only four are explicitly numbered for clarity.

It is yet further appreciated that, while only ten downwards curved rungs 109 are depicted in FIG. 1, any suitable number of downward curved rungs 109 are within the scope of present implementations. For example, a successful prototype, as depicted in FIG. 1, includes thirty-five downwardly curved rungs 109.

In any event, in depicted implementations, carrier 100 further comprises upwards curved rungs 113-1, 113-2, 113-3, 113-4, 113-5, 113-6, 113-7, 113-8, 113-9, 113-10 paired with downward curved rungs 109 in a one-to-one relationship and aligned therewith. Upwards curved rungs 113-1, 113-2, 113-3, 113-4, 113-5, 113-6, 113-7, 113-8, 113-9, 113-10 will also be interchangeably referred to hereafter, collectively, as upwards curved rungs 113 and, generically, as an upwards curved rung 113. Further, each of upwards curved rungs 113 are curved in a direction opposite that of downwards curved rungs 109, and with a same respective radius as downwards curved rungs 109. Further, each respective upwards curved rung 113 is located beneath a respective paired downwards curved rung 109.

It is further appreciated that, in depicted implementations, carrier 100 further comprises solid projections 114-1, 114-2, 114-3, 114-4, 114-5, 114-6, 114-7, 114-8, 114-9, 114-10, which will also be interchangeably referred to hereafter, collectively, as projections 114 and, generically, as a projection 114. Each projection 114 comprises a respective pair of a downwards curved rung 109 and an upwards curved rung 113. Indeed, each projection 114 is appreciated to be in the shape of one or more of: an ellipse, an oval, a pointed ellipse, a pointed oval, a mandorla, an intersection of two circles, and a vesica piscis. As depicted, each pair of downwards curved rungs 109 and upwards curved rungs 113 is in the shape of an intersection of two circles, which can also be referred to as a vesica piscis. Each of the circles has a radius that is greater than or equal to about the minimum bend radius of the given optical fiber for which carrier 100 is designed.

Indeed, as will be explained in further detail below, a given optical fiber can be one or more of hung from, guided by and routed around one or more downwards curved rungs 109 and, as the radius of curvature of downwards curved rungs 109 is greater than or about equal to the minimum bend radius of the given optical fiber, the given optical fiber cannot bend beyond the minimum bend radius, thereby preventing damage to the given optical fiber, while simultaneously storing an excess of the given optical fiber.

It is yet further appreciated that optical fibers generally have a minimum bend radius of about 200× a cladding outer-diameter, hence carrier 100 can be designed for a given minimum bend radius of a given optical fiber. For example a 400 µm diameter optical fiber with a 440 µm cladding outer diameter would have a minimum bend radius of about 88 mm. Hence, in some implementations, each downwards curved rung 109 can comprise a radius that is greater than or about equal to about 88 mm to route optical fibers having a cladding outer diameter of 440 µm. However, other minimum bend radii can be used: for example, for optical fibers of greater than 440 µm cladding outer diameter, a larger bend radius than 88 mm could be used; and for optical fibers of less than 440 µm cladding outer diameter, a smaller bend radius than 88 mm could be used.

Carrier 100 can further comprise at least one fiber breakout mount 115-1, 115-2, 115-3 (interchangeably referred to hereafter, collectively, as fiber breakout mounts 115 and, generically, as a fiber breakout mount 115). Fiber breakout mounts are located in at least one outer vertical channel 108 enabled to hold a fiber breakout of the bundle, wherein a greater the distance of a given downwards curved rung 109 from at least one fiber breakout mount 115, a greater an excess of the given optical fibers a given downwards curved rung 109 can route. This is explained in more detail with reference to FIG. 5.

In depicted implementations, carrier 100 comprises a left outer vertical channel 108 and a right outer vertical channel 108, once at each vertical edge 103, though in other implementations carrier 100 can comprise one or no vertical channels, with channelling of given optical fibers from a bundle to downwards curved rungs 109 occurring external to carrier 100. In any event, in depicted implementations, carrier 100 comprises three fiber breakout mounts 115, fiber breakout mounts 115-1, 115-2 in a right outer vertical channel 108, and fiber breakout mount 115-3 in a left outer vertical channel 108, each of the three fiber breakout mounts 115 enabled to hold a respective fiber breakout of each of three optical fiber bundles. For example, carrier 100 can be integrated into a projector system with red, green and blue light produced by respective lasers (not depicted), and each of the three bundles can respectively convey red, green and blue light to projection optics, with carrier 100 taking up excess of respective optical fibers conveying the red, green and blue light in each of the three bundles.

In any event, as depicted, each fiber breakout can comprise an intermediate breakout ferrule, and hence each fiber breakout mount 115 can be enabled to mount an intermediate breakout ferrule. For example, as depicted, each fiber breakout mount 115 can comprise opposing clips for holding an intermediate breakout ferrule.

Furthermore, to route the bundle of given optical fibers to the fiber breakout mounts 115, carrier 100 can comprise one or more of a cutout 117 (as depicted) and an aperture in planar surface 101 beneath at least one fiber breakout mount 115 for receiving the bundle of the given optical fibers from a rear side of planar surface 101. As depicted, carrier 100 comprises two cutouts 117, one beneath each of fiber breakout mounts 115-2, 115-3. In other words, as depicted, carrier 100 is enabled to route given optical fibers from three bundles, two of which are threaded through cutouts 117 on opposite sides of carrier 100, through respective outer vertical channels 108, with a respective fiber breakout mounted to respective fiber breakout mount 115 above each cutout 117; the third bundle comes from near the right side of bottom edge 107 of carrier 100, through the right outer vertical channel 108, with the respective fiber breakout mounted to the fiber breakout mount above the lower right corner of carrier 100.

Hence, it is appreciated that at least one outer vertical channel 108 is enabled to one or more of: guide the bundle of the given optical fibers; mount the bundle of the given optical fibers; and guide the given optical fibers to the downwards curved rungs 109, as will be explained in further detail below.

With further reference to FIG. 1, carrier 100 further comprises at least one inner vertical channel 118, adjacent at least one outer vertical channel 108, enabled to guide the given optical fibers from a given downwards curved rung 109 (and/or a given upwards curved rung 113) to one or more of a further downwards curved rung 109 (and/or a given upwards curved rung 113) and one of exit conduits 111. For example, in depicted implementations, carrier 100 comprises two inner vertical channels 118, one adjacent each of outer vertical channels 108. But, in other implementations, carrier 100 could comprise one or no inner vertical channels, with routing of given optical fibers from downwards curved rungs 109 (and/or upwards curved rungs 113) to exit conduits 111 via any other suitable external devices.

In any event, inner vertical channels 118 are formed by first projections 119 from planar surface 101 and second projections 121 from the planar surface 101. For clarity, only four of each of projections 119, 121 are numbered in FIG. 1. First projections 119 are generally aligned with respective horizontal ends of downwards curved rungs 109, and second projections 121 are adjacent outer vertical channels 108. While in depicted implementations, second projections 121 are horizontally aligned with first projections 119, present implementations are not so limiting and second projections 119 can be located elsewhere along the line between an outer vertical channel 108 and a respective inner vertical channel 118.

First projections 119 can be any suitable shape but as depicted, first projections 119 are generally rhomboidal, with curved corners, comprising at least one edge 123 forming a first side of the at least one inner vertical channel, the at least one edge enabled to guide the given optical fibers from downwards curved rungs 109 to at least one inner vertical channel 118. In particular, at least a portion of a slope of edge 123, of each first projection 110 lies on a radius of one or more downwards curved rungs 109 and one or more upwards curved rungs 113, the radius comprising the given minimum bend radius of the given optical fiber for which carrier 100 is designed. In other words, each of first projections 119 assist in controlling a bend radius of the given optical fiber when looped around one or more of downwards curved rungs 109 and upwards curved rungs 113.

Second projections 121 can also be any suitable shape, but as depicted, second projections 121 are generally rectangular; indeed, the shape and position of second projections 121 is generally non-limiting as second projections 121 do not generally assist in controlling a bend radius of the given optical fiber when looped around one or more of downwards curved rungs 109 and upwards curved rungs 113. Further at least one outer vertical channel 108 is formed by the second projections 121 and third projections 125 from planar surface 101, third projections 125 forming exit conduits 111. In other words, exit conduits 111 are between third projections 125. Third projections 125 can also be any suitable shape, but as depicted, third projections 125 are generally rectangular.

Carrier 100 further comprises respective guide conduits 127 horizontally aligned with respective exit conduits 111, and each of respective guide conduits 127 are located between respective horizontal ends of adjacent downwards curved rungs 109. It is appreciated that outer edges of each of respective guide conduits 127 are enabled to further assist in guiding the given optical fibers from a given downwards curved rung 109 to an inner vertical channel 118. For clarity, only two guide conduits 127 are numbered in FIG. 1. Indeed, as depicted guide conduits 127 are formed by pairs of fourth projections 129 from planar surface 101, only eight of which are numbered in FIG. 1 for clarity. Outer edges 130 of fourth projections 129 are enabled to further assist in guiding the given optical fibers from a given downwards curved rung 109 to an inner vertical channel 118; in other words, the slope of outer edge 130 of fourth projections 129 lies on a radius of one or more downwards curved rungs 109 and one or more upwards curved rungs 113, the radius comprising the given minimum bend radius of the given optical fiber for which carrier 100 is designed. In other words, each of first projections 129 assist in controlling a bend radius of the given optical fiber when looped around one or more of downwards curved rungs 109 and upwards curved rungs 113. In depicted implementations, fourth projections 129 are triangular in shape, with rounded corners, but the shape thereof is generally non-limiting, other than as described above.

Figure 2:
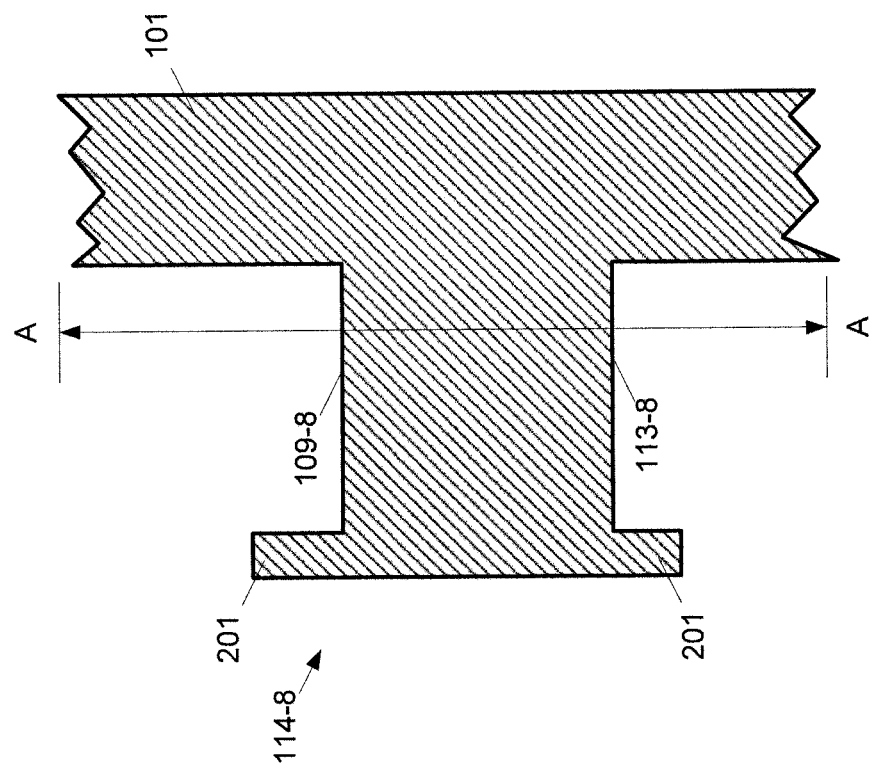
FIG. 2 depicts a cross-section of a projection of the optical fiber carrier of FIG. 1 through line A-A, and further depicts a flange thereof, according to non-limiting implementations.

Attention is next directed to FIG. 2, which depicts a cross-section of projection 114-8 along line A-A of FIG. 1. It is appreciated that the cross-section of each projection 114 is similar to the cross-section of projection 114-8 is depicted in FIG. 2. In any event, depicted in cross-section in FIG. 1 is a peak of downwards curved rung 109-8, a bottom of paired upwards curved rung 113-8 and their connection to planar surface 101. Further depicted is a flange 201 extending from downwards curved rung 109-8 and upwards curved rung 113-8. It is further appreciated that flange 201 extends around at least a portion of the a perimeter of each of at least downwards curved rung 109-8 and optionally upwards curved rung 113-8, and that flange 201 prevents the given optical fibers from sliding off one or more of downwards curved rung 109-8 (and upwards curved rung 113-8). It is further appreciated that each projection 114 comprises a similar flange 201. However, it is yet further appreciated that while flange 201 can be optional, flange 201 assists in preventing the given optical fibers from sliding off of at least one or more of downwards curved rungs 109 and optionally upwards curved rungs 113 when carrier 100 is installed in a vertical orientation (for example, see FIG. 11, as described below).

From FIG. 2, it is further appreciated that planar surface 101 has a horizontal thickness and that projections 114 and planar surface 101 can form an integrated structure, and can be formed from a suitable metal and/or plastic. Further, carrier 100 can be manufactured using any suitable technique including, but not limited to:

1) Stereolithography (SLA), and the like; in these implementations, carrier 100 can comprise UV (ultra-violet) curable plastics; further, in these implementations, flange 201 can be integral with each projection 114;

2) Injection Molding; in these implementations, carrier 100 can comprise polypropylene, polyethylene, and/or any other suitable thermoplastic; further, in these implementations, flange 201 can comprise an assembly attached to each projection 114;

3) Metal Casting; in these implementations, carrier 100 can comprise one or of aluminum, magnesium, zinc and/or any other suitable metal; further, in these implementations, flange 201 can comprise an assembly attached to each projection 114;

4) Metal machining; in these implementations, carrier 100 can comprise one or of sheet metal, machined metal aluminum, steel, stainless steel and/or any other suitable metal; further, in these implementations, flange 201 can comprise an assembly attached to each projection 114.

Further, depending on the manufacturing technique, projections 114, 119, 129, 121, 125 can be one or more of attached and removably attached to planar surface 101.

It is further appreciated that dimensions of projections 114, downwards curved rungs 109, upwards curved rungs 113 and flanges 201 can be adapted for a core diameter and/or given minimum bend radius of the given optical fiber the applicable fiber and/or a quantity of fibres per bundle of optical fibers that carrier 100 is to route. For example, bundle of thirty-five 400 μm diameter core optical fibres, each of projections 114 can be about 33 mm tall at their widest vertical point, and about 14 mm deep (i.e. from front of planar surface 101 to back of flange 201), and each flange 201 can comprise a 7 mm flange protruding perpendicularly around a portion of a perimeter of each projection 114.

Figure 3:
FIG. 3 depicts various non-limiting implementations of rungs of the optical fiber carrier of FIG. 1, according to non-limiting implementations.
Figure 3:
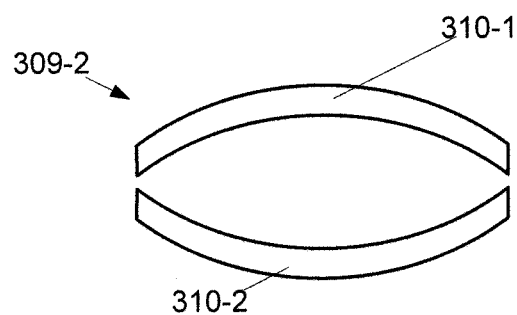
Figure 3:
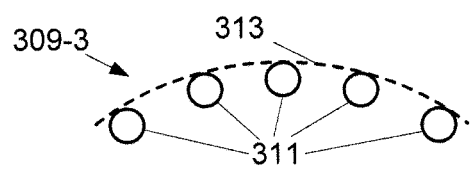
Figure 3:
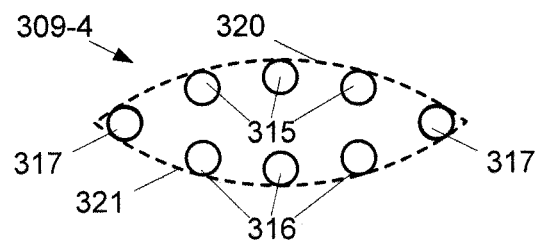

Attention is next directed to FIG. 3, which depicts various alternative implementations of one or more of downwards curved rungs 109 and upwards curved rungs 113. For example, it is appreciated that each of downwards curved rungs 109 and upwards curved rungs 113 are formed, in FIG. 1, by respective edges of projections 114. In other words, each respective solid projection 114 comprises a respective downwards curved rung 109 and a respective upwards curved rung 113.

However, present implementations are not so limiting. For example, in some implementations, one or more of projections 114 could be replaced by downwards curved rung 309-1 which comprises a ridge having a radius greater than or equal to the given minimum bend radius, and which can project from planar surface 101 in place of a projection 114. In other words, in these implementations, there is no corresponding paired upwards curved rung.

In yet further implementations, however, one or more of projections 114 could be replaced by rung 309-2 which comprises a pair of oppositely curved ridges 310-1, 310-2 which can project from planar surface 101 in place of a projection 114. In these implementations, the upper curved ridge 310-1 corresponds to a downwards curved rung 109, and the lower curved ridge 310-2 corresponds to an upwards curved rung 113. In some implementations, ridges 310-1, 310-2 are joined at the ends, while in other implementations (as depicted), there is a gap between ridges 310-1, 310-2.

In yet further implementations, one or more of projections 114 could be replaced by rung 309-3 which comprises a plurality of pins 311 arranged along a curve 313 having a radius greater than or equal to the given minimum bend radius. Pins 311 can project from planar surface 101 in place of a projection 114. In these implementations, pins 311 correspond to a downwards curved rung 109. In these implementations, there are no pins which correspond to a paired upwards curved rung. It is further appreciated that rung 309-3 comprise five pins 311, in other implementations as few as three pins could be used. Indeed, three or more pins 311 could be used to form curve 313. In some implementations, pins 311 can be touching one another. Further, pins 311 can be of any suitable diameter (when circular in cross-section, as depicted), and of any suitable shape.

However, in yet further implementations, one or more of projections 114 could be replaced by rung 309-4 which comprises a plurality of pins 315, 316, 317, similar to pins 311, arranged along an upper curve 321 and a lower curve 322, each having a radius eater than or equal to the given minimum bend radius. Pins 315, 316, 317 can project from planar surface 101 in place of a projection 114. In these implementations, pins 315, 317 correspond to a downwards curved rung 109, and pins 316, 317 correspond to an upwards curved rung 113. It is appreciated that pins 317 are along both of curves 321, 322.

It is further appreciated that while each of rung 309-4 comprises eight pins 315, 316, 316, in other implementations rung 309-4 can comprise any suitable number of pins of any suitable diameter and any suitable shape.

Figure 4:
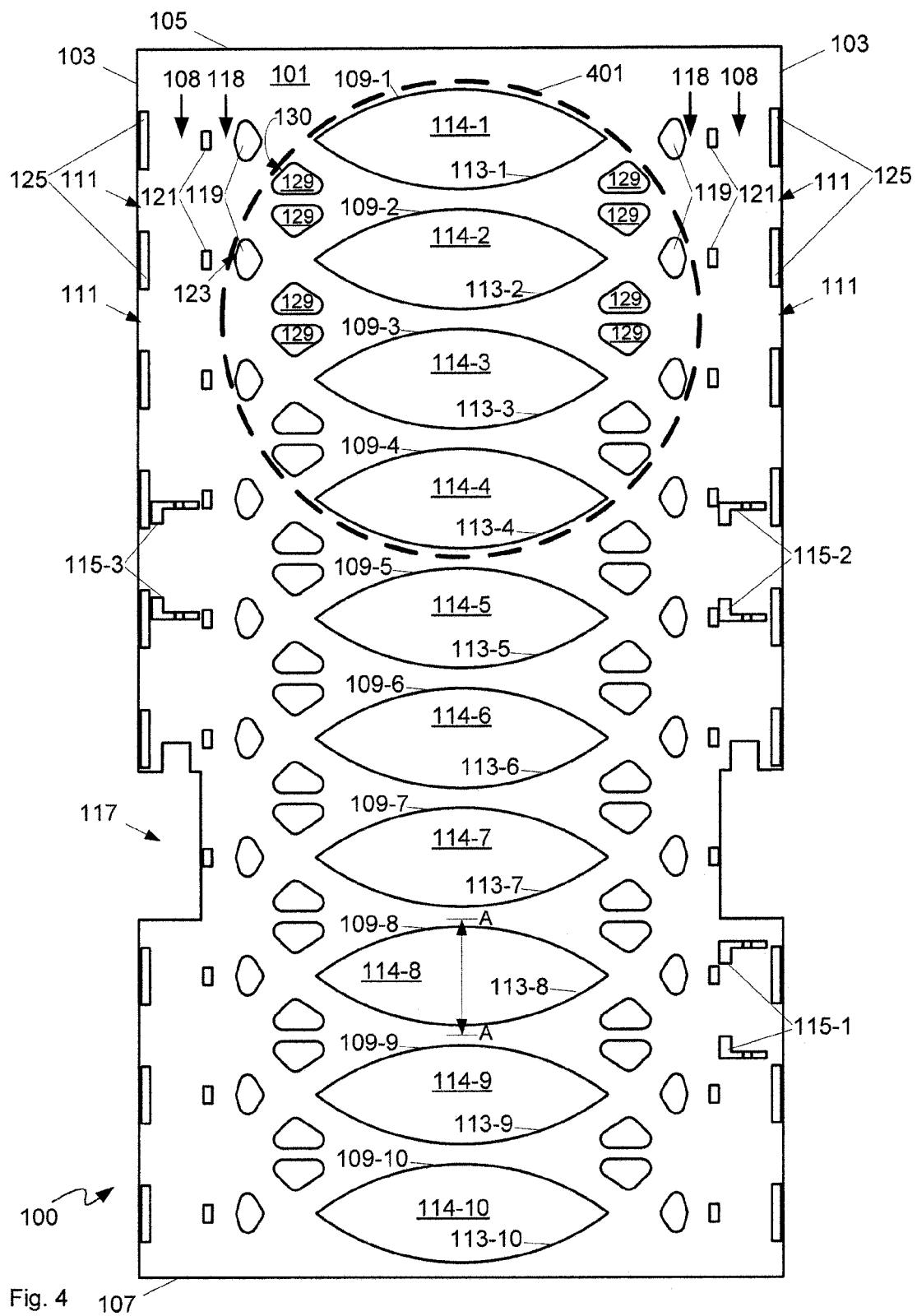
FIG. 4 depicts the optical fiber carrier of FIG. 1 and further showing a circle of the minimum bend radius of a given optical fiber which the optical fiber carrier can route, according to non-limiting implementations.

Attention is next directed to FIG. 4, which is similar to FIG. 1, with like elements having like numbers. However, it is appreciated that while not all elements are numbered in FIG. 4, they are nonetheless present: for example, guide conduits 127 are not numbered in FIG. 4, but are appreciated to be nonetheless present.

FIG. 4 hence depicts carrier 100 but with a circle 401 overlaid thereupon, circle 401 comprising a radius that is greater than or about equal to the minimum bend radius of the given optical fiber that carrier 100 is enabled to route. It is further appreciated that downwards curved rung 109-1 and upwards curved rung 113-4 are generally on a circumference of circle 401. In other words, a distance between a peak of downwards curved rung 109-1 and a bottom of upwards curved rung 113-4 (i.e. associated with downwards curved rung 109-4 located beneath downwards curved rung 109-1), is greater than or equal to about twice the minimum bend radius and/or is about the diameter of circle 401. Hence, the given optical fiber can be looped around each of projections 114-1, 114-4 in a path similar to that of circle 401, projections 114-1, 114-4 maintaining a bend radius of the optical fiber that is greater than or about equal to the minimum bend radius of the given optical fiber. In other words, circle 401 is representative of at least a portion of a path of a given optical fibre when looped around downwards curved rung 109-1 and upwards curved rung 113-4.

Hence, a size and pitch of projections 114 is such that a distance between a top of a given downwards curved rung 109 and a bottom of a given upwards curved rung 113, associated with another downwards curved rung 119 located beneath the given downwards curved rung 109, is greater than or equal to about twice the minimum bend radius.

In depicted implementations, the pitch is such that four projections 114 are within circle 401, while, in other implementations, the pitch is such that as few as two or three projections 114 fit within circle 401, while in other implementations, the pitch is such that more than four projections 114 fit within circle 401.

It is further appreciated from FIG. 4 that edge 130 of the upper left projection 129 and edge 123 of second from the top of left hand projections 119 are located on a radius of circle 401 to assist in maintaining the given minimum bend radius of the given optical fiber when looped around downwards curved rung 109-1. Indeed, it is appreciated that outer edges 123 of four of each of projections 119 and outer edges 130 of four of each of projections 129 are located on a radius of circle 401; hence four of each of projections 119, 129 assist in maintaining a radius of the given optical fiber when looped around downwards curved rung 109-1. In other words, each of projections 119, 129 are located such that respective outer edges 123, 130 are located on a radius formed by at least one of downwards curved rungs 109 and/or upwards curved rungs 113 (i.e. along the given minimum bend radius)

Figure 5:
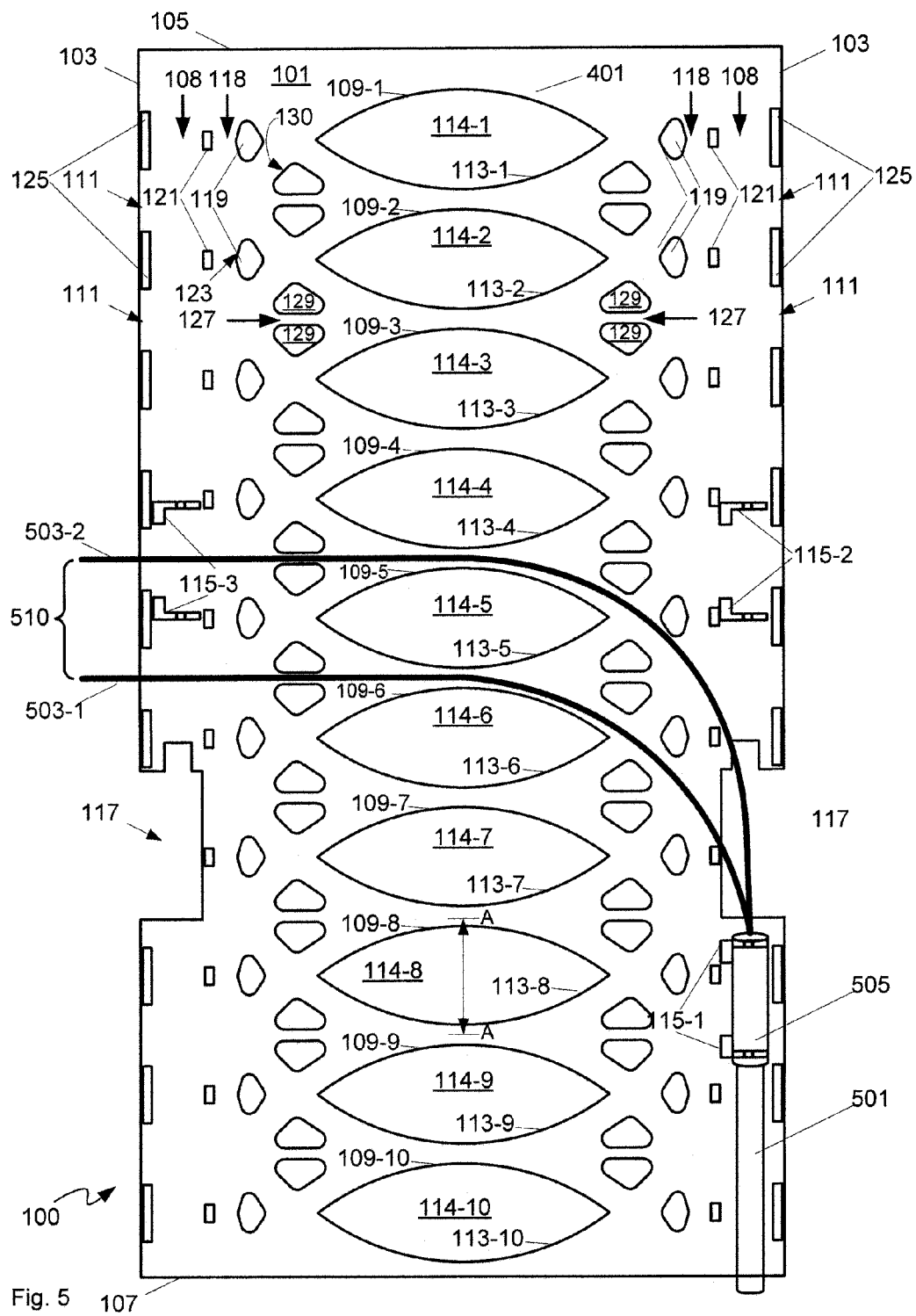
FIG. 5 depicts the optical fiber carrier of FIG. 1 routing two given optical fibers from a bundle of optical fibers, according to non-limiting implementations.

Attention is next directed to FIG. 5, which is similar to FIG. 1, with like elements having like numbers. FIG. 5 depicts a bundle 501 of given optical fibers 503-1, 503-2 extending from a fiber breakout 505 of bundle 501, fiber breakout 505 mounted in fiber breakout mount 115-1. Given optical fibers 503-1, 503-2 will also be interchangeably referred to hereafter, collectively, as fibers 503 and generically as a fiber 503. While only two optical fibers 503 are depicted in FIG. 5, it is appreciated that bundle 501 can comprise any number of optical fibers, and only two are depicted for clarity.

In any event, FIG. 5 depicts carrier 100 in a simple use situation and further illustrates that a greater the distance of a given downwards curved rung 109 from the at least one fiber breakout mount 115-1, a greater an excess of given optical fibers 503 given downwards curved rungs 109 can route.

For example, optical fiber 503-1 is routed over downwards curved rung 109-6 and optical fiber 503-2 is routed over downwards curved rung 109-5, which is above adjacent downwards curved rung 109-6. Hence, as downward curved rung 109-5 is further above fiber breakout mount 115-1 than downward curved rung 109-6 by a distance 510, downwards curved rung 109-5 routes a greater excess of optical fiber 503-2, than downwards curved rung 109-6 routes of optical fiber 503-1. Indeed, distance 510 is about equal to a distance between centers of each projection 114 and/or a vertical distance between adjacent downwards curved rungs 109 and/or a vertical distance between adjacent upwards curved rungs 113. It is appreciated that distance 510, which is also about equal to a pitch of one or more of projections 114, downwards curved rungs 109 and/or upwards curved rungs 113, is one or more of between about 30 mm and 60 mm; less than about 100 mm; and less than about 200 mm. In a successful prototype comprising thirty-five projections 114, distance 510 was about 47.75 mm, to accommodate thirty-five 400 μm core diameter optical fibres (however this dimension can be adapted for optical fibres of other core diameters, as described above). However, in other implementations distance 510 (i.e. a pitch of projections 114) can comprise a multiple of a standard rack unit, i.e. about 44.5 mm (about 1.75 inches).

In other words, carrier 100 provides a fine resolution for optical fiber looping in order to facilitate, for example, 40-50 mm increments of fiber length adjustment. This provides an installer with many optical fiber looping alternatives in a compact space. Further, one or more of projections 114, downwards curved rungs 109 and/or upwards curved rungs 113 control the bend radius of given optical fibers 503 thereby protecting them from excessive stress. In addition, flanges 201 at each projection 114 prevent optical fibers from slipping off of downwards curved rungs 109 when carrier 100 is installed in a vertical orientation.

In contrast, without carrier 100 to take up excess of optical fibers 503, optical fibers 503 would need to be looped: for example, when the minimum bend radius is 176 mm, each loop would consume over 1 meter of optical fiber length. The present carrier 100 allows for much finer adjustment as compared to fiber looping, and further provides an installer with many alternatives to fiber looping in a compact space.

Figure 6:
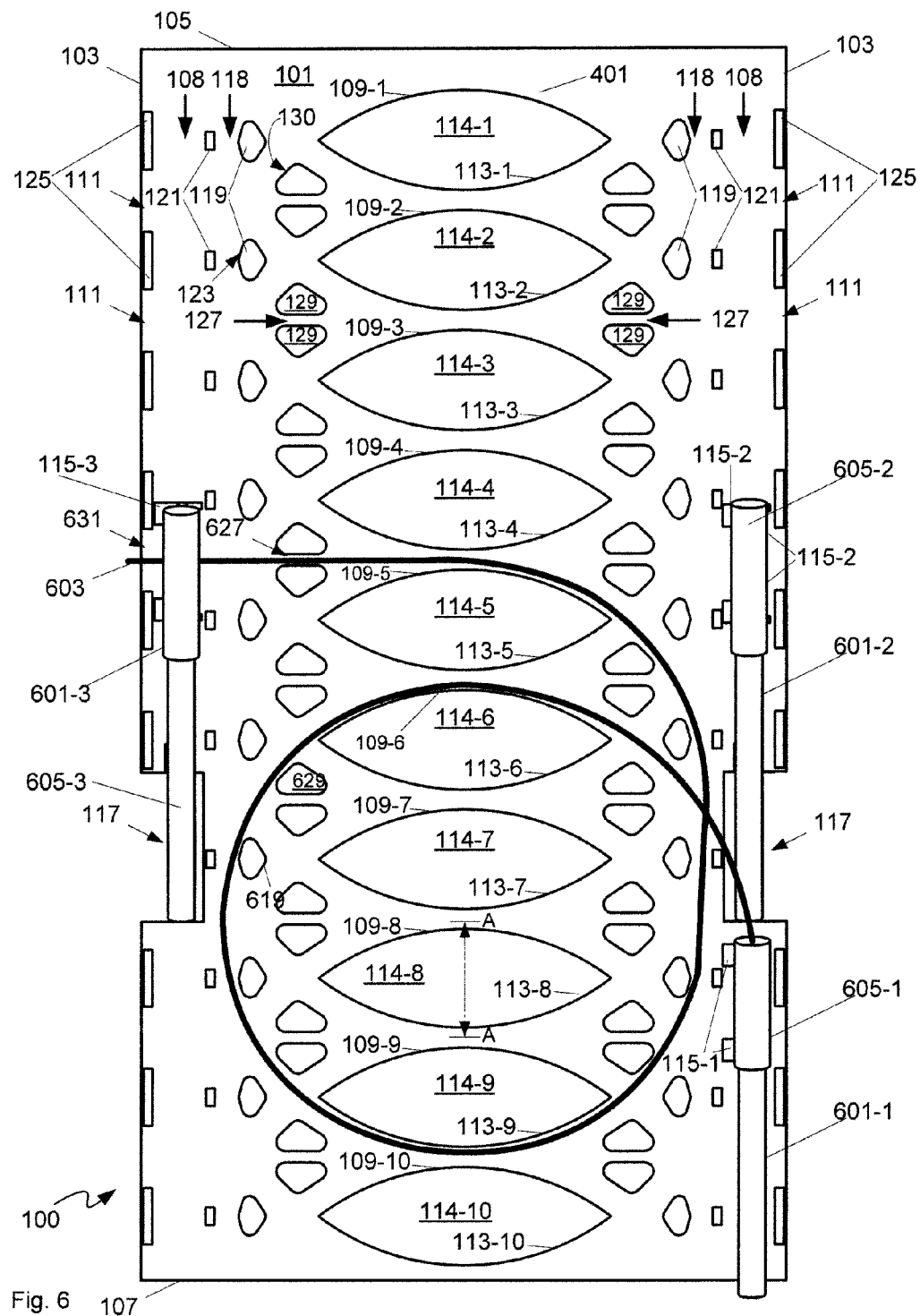
FIG. 6 depicts the optical fiber carrier of FIG. 1 routing a given optical fiber from a first bundle of optical fibers, and further showing locations of two further bundles of optical fibers routed from behind the optical fiber carrier through cutouts, according to non-limiting implementations.

This is further illustrated in FIG. 6, which is substantially similar to FIG. 5, with like elements having like numbers, however, FIG. 6 depicts a bundle 601-1 of given optical fibers 603 extending from a fiber breakout 605-1, mounted in fiber breakout mount 115-1. While only one optical fiber 603 is depicted in FIG. 6, it is appreciated that bundle 601-1 can comprise any number of optical fibers, and only one is depicted for clarity. In any event, optical fiber 603 is routed around downwards curved rung 109-6, and down to left hand inner vertical channel 118, assisted by projection 629 (similar to projections 129) and projection 619 (similar to projections 119), and then around upwards curved rung 113-9 and up through right hand inner vertical channel 118, and over downwards curved rung 109-5, through guide conduit 627 (similar to guide conduits 127) and out of carrier 100 through exit conduit 631 (similar to exit conduits 111). Further, as optical fiber 603 is guided through carrier 100, various elements of carrier 100 assist at maintaining the bend radius at about equal to or greater than the minimum bend radius.

It is further appreciated that inner vertical channels 118 are uses to route optical fiber 603 vertically up and vertically down through carrier 100 after routed over at least one downwards curved rung 109.

It is yet further appreciated that FIG. 6 also depicts bundles 601-2, 601-3, comprising respective fiber breakouts 605-2, 605-3, mounted in respective fiber breakout mounts 115-2, 115-3. While optical fibers associated with each of bundles 601-2, 601-3 are not depicted for clarity, it is appreciated that optical fibers from each of bundles 601-2, 601-3 can also be routed through carrier 100 (for example, see FIGS. 8, 9 and 10). However, FIG. 6 further depicts that each of bundle 601-2, 601-3 are fed through respective cutouts 117 from a rear of carrier 100.

Further, different routing schemes can be used for different optical fibers, depending on one or more of which fiber breakout mount 115 a fiber breakout is mounted. For example, FIGS. 7, 8, 9, and 10 depict different routing schemes throe carrier 100. Each of FIGS. 7, 8, 9, 10 are similar to one another and depict only a portion of elements of carrier 100, and specifically a subset of projections 114, (numbered as: projections 714-1, 714-2, 714-3,3 in FIG. 7, as projections 814-1, 814-2, 814-3 in FIG. 8, as projections 914-1, 914-2, 914-3 in FIG. 9, and as projections 1014-1, 1014-2 in FIG. 10) as well an optical fiber 701 from a fiber breakout 705. It is also assumed that optical fiber 701 will be connecting to further optical components located at a left-hand side of carrier 100.

Figure 7:
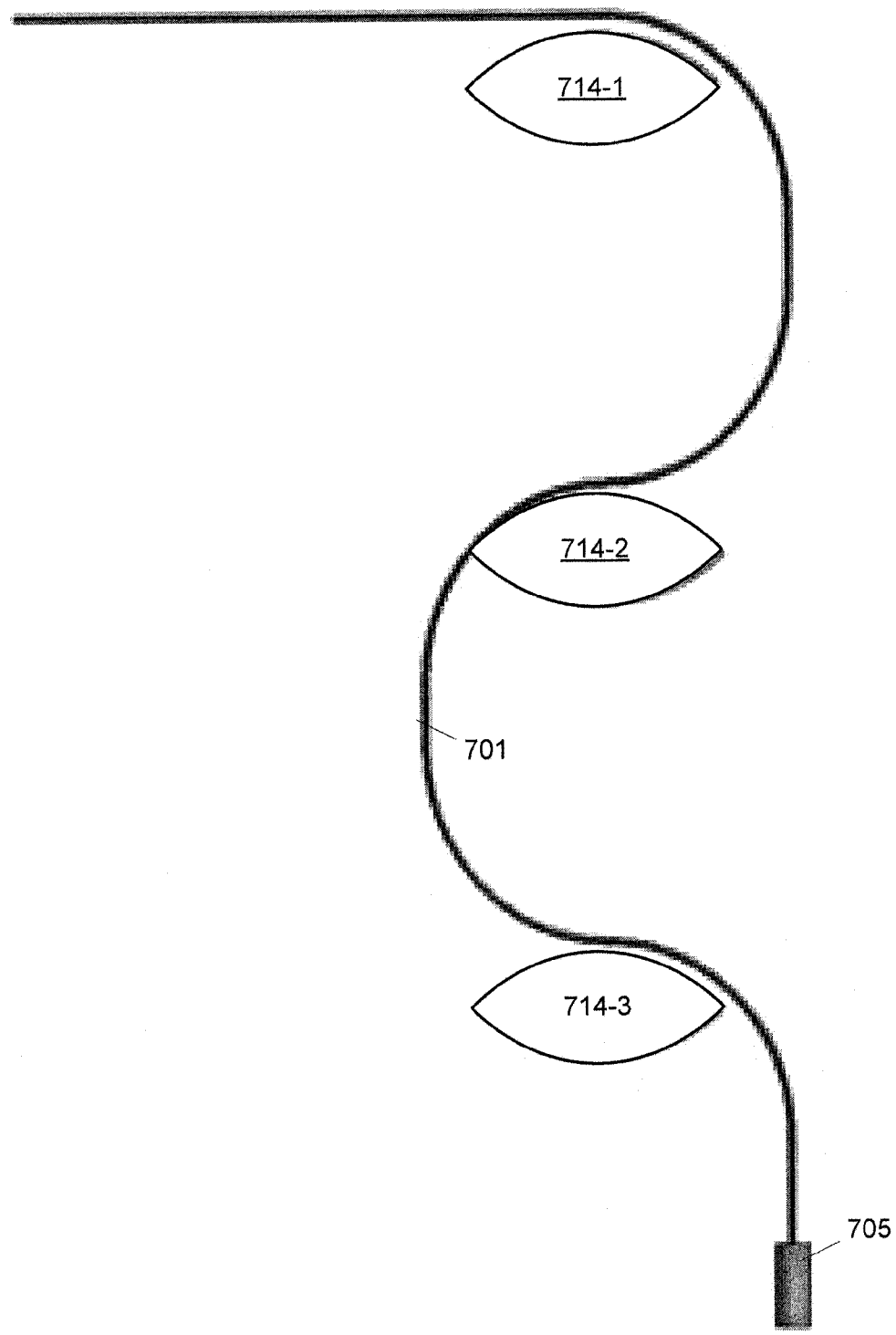
FIG. 7 depicts a routing scheme for an optical fiber through carrier 100, according to non-limiting implementations.

For example, in FIG. 7, it is further assumed that fiber breakout 705 is mounted in fiber breakout mount 115-1, and optical fiber 701 is routed over projection 714-3, up through left-hand inner vertical channel 118 (not depicted) and over projection 714-2, again up through right hand inner vertical channel 118 (not depicted), over projection 714-1 and through a corresponding left-hand exit conduit 111 (not depicted).

Figure 8:
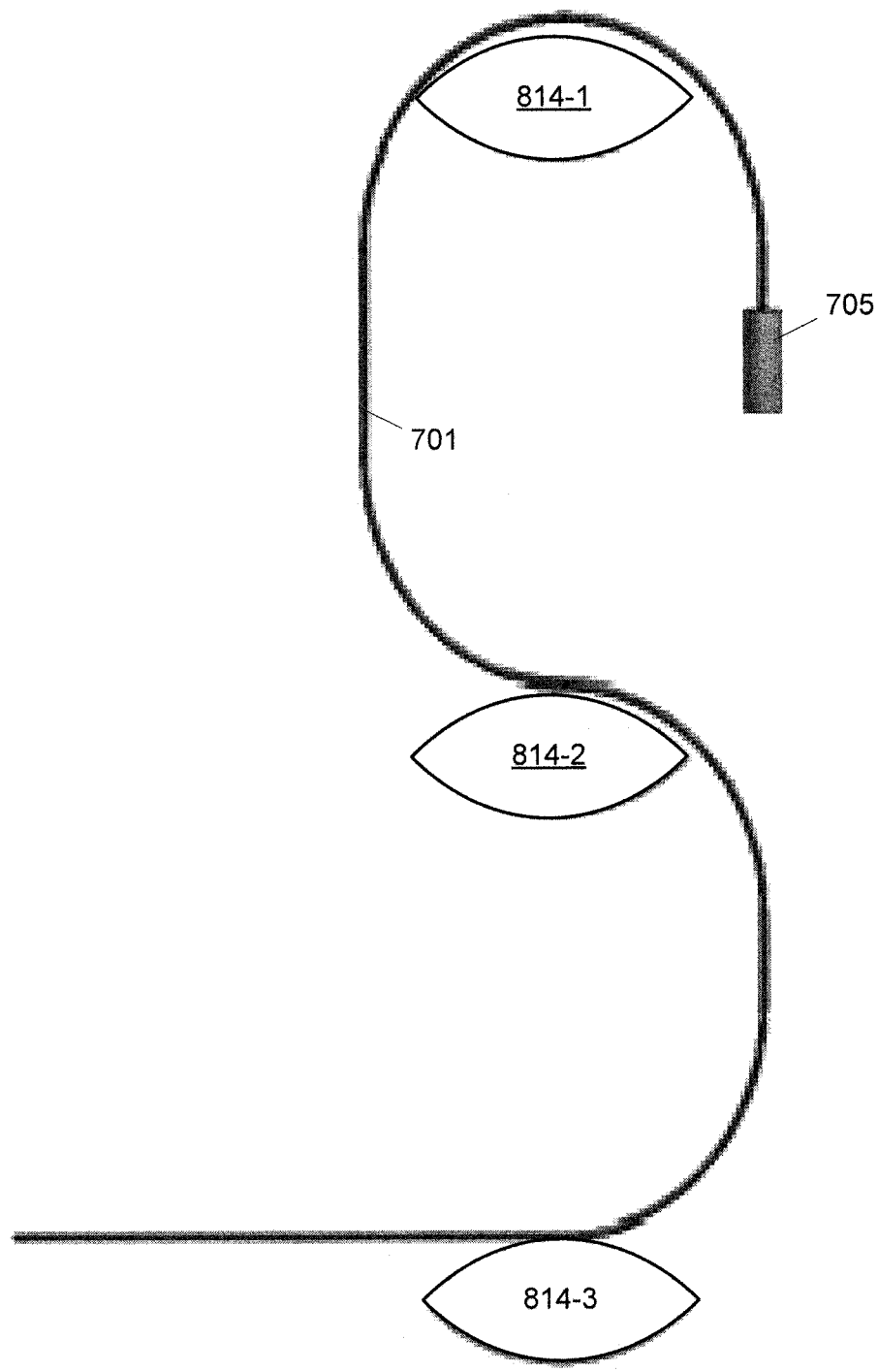
FIG. 8 depicts a routing scheme for an optical fiber through carrier 100, according to non-limiting implementations.
Figure 9:
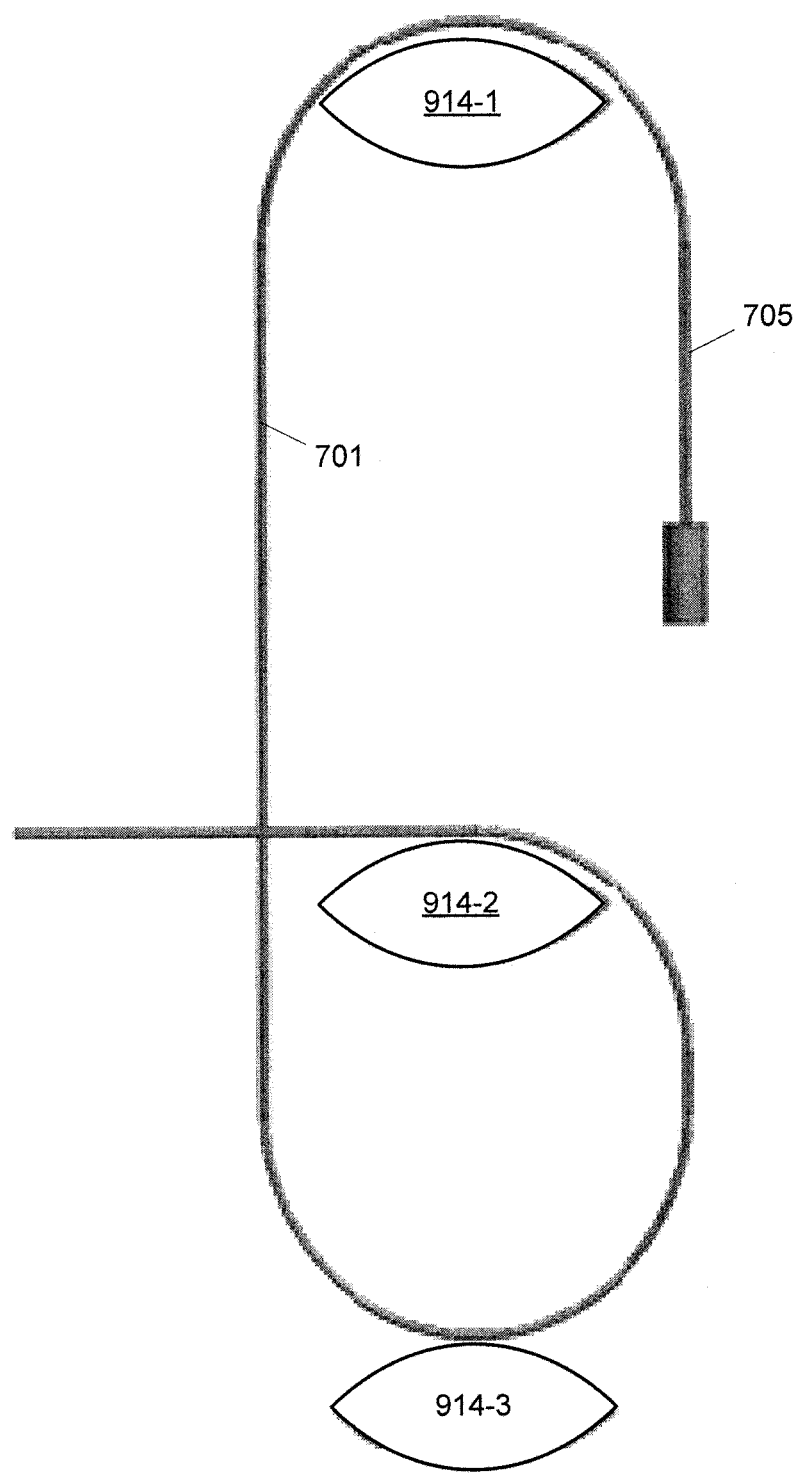
FIG. 9 depicts a routing scheme for an optical fiber through carrier 100, according to non-limiting implementations.

In FIG. 8 it is further assumed that fiber breakout 705 is mounted in fiber breakout mount 115-2, and optical fiber 701 is routed over projection 814-1, down through left-hand inner vertical channel 118 (not depicted) and over projection 814-2, down through right hand inner vertical channel 118 (not depicted), over projection 814-2 and through a corresponding left-hand exit conduit 111 (not depicted).

In FIG. 9 it is again assumed that fiber breakout 705 is mounted in fiber breakout mount 115-2, and optical fiber 701 is routed up through right hand outer vertical channel 108, over projection 914-1, down through left-hand inner vertical channel 118 (not depicted) and over projection 914-3, up through right hand inner vertical channel 118 (not depicted), looped around projection 914-2 and through a corresponding left-hand exit conduit 111 (not depicted). Comparing the routing scheme of FIG. 9 to FIG. 8, it is appreciated that the routing scheme of FIG. 9 routes more of an excess of optical fiber 701 than does the routing scheme of FIG. 8.

Figure 10:
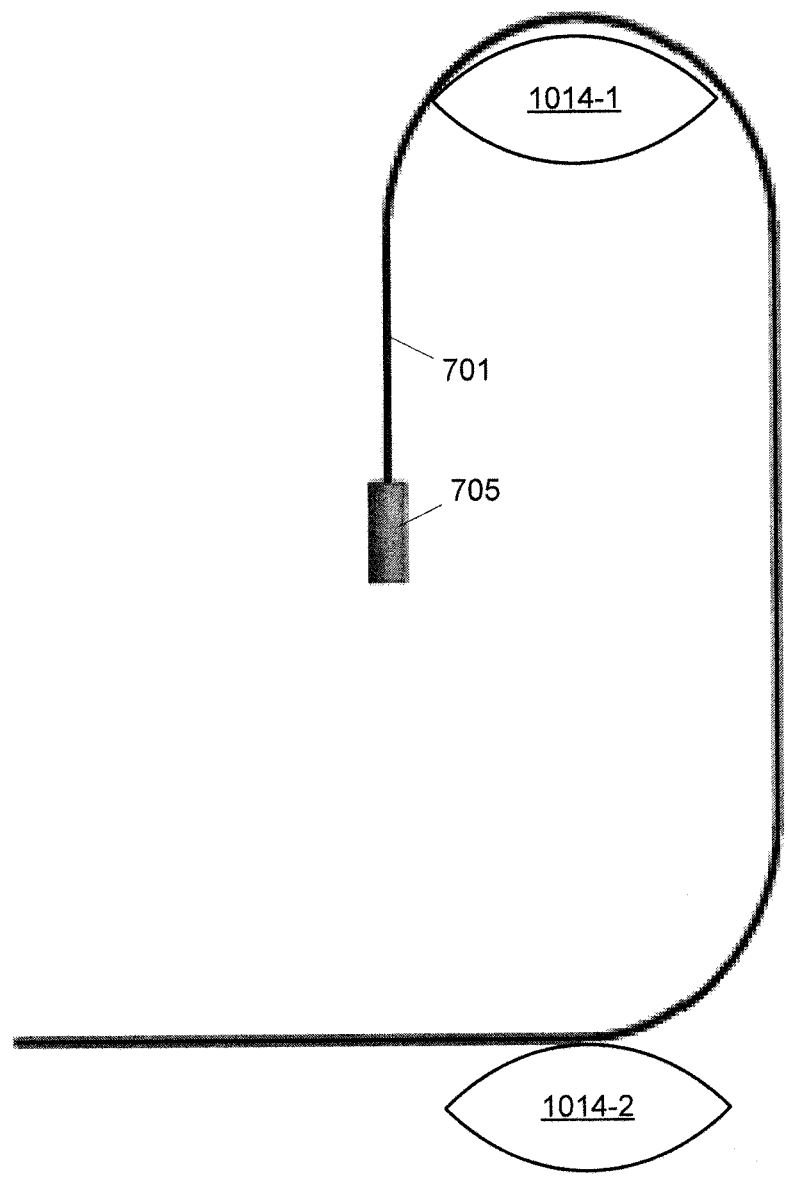
FIG. 10 depicts a routing scheme for an optical fiber through carrier 100, according to non-limiting implementations.

In FIG. 10 it is further assumed that fiber breakout 705 is mounted in fiber breakout mount 115-3, and optical fiber 701 is routed over projection 1014-1, down through right-hand inner vertical channel 118 (not depicted), over projection 1014-2, and through a corresponding left-hand exit conduit 111 (not depicted).

In other words, FIGS. 7 to 10 depict different routing schemes through carrier 100, which depend on which fiber breakout mount 115 fiber breakout 705 is mounted in.

Figure 11:
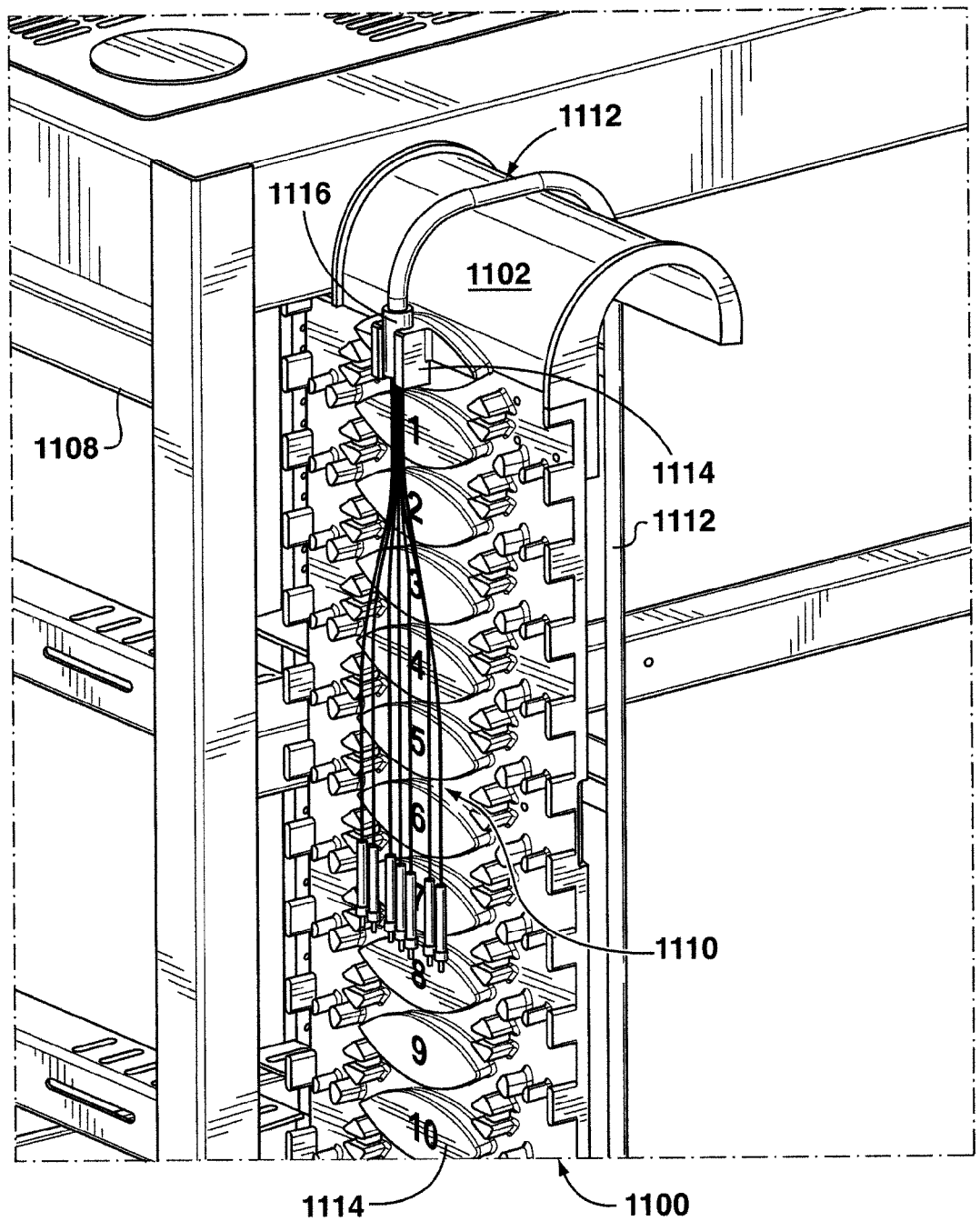
FIG. 11 depicts a perspective view of a portion of a successful prototype of an optical fiber carrier having a hanger portion that also assists in detangling optical fibers, according to non-limiting implementations.

Attention is next directed to FIG. 11, which depicts a perspective view of a portion of further implementations of a carrier 1100, installed in a vertical direction adjacent a cabinet 1108, for example using mounting brackets, according to non-limiting implementations carrier 1100 comprising a successful prototype of carrier 100. Indeed, carrier 1100 is substantially similar to carrier 100, with like elements having like numbers, but preceded by an "11" rather than a "1". It is further appreciated that not all elements of carrier 1100 are numbered for clarity, but are nonetheless present. In any event, carrier 1100 comprises a planar surface 1101, and a plurality of projections 1114 similar to projections 114, though only one projection 1114 is numbered in FIG. 1. Carrier 1100 further comprises thirty-five projections 1114, though only ten are depicted, the remaining twenty five projections 1114 being beneath the lowest depicted projection 1114.

Further, it is appreciated that carrier 1100 is attached in a vertical orientation adjacent cabinet 1108 using any suitable attachment mechanism (not visible in FIG. 11), including, but not limited to a mounting brackets, a screw assembly, cable ties and the like. As depicted, carrier 1100 is mounted adjacent cabinet 1108 that can contain optical components to which optical fibers routed by carrier 1100 can be connected.

In any event, carrier 1100 further comprises a hanger portion 1102 extending from an upper edge of planar surface 1101 enabled to assist in detangling optical fibers 1110 from a bundle 1112. For example, in depicted implementations, hanger portion 1102 is curved at a radius that is about equal to or greater than given minimum bend radius of optical fibers 1110, such that bundle 1112 can be hung over hanger portion 1102 to de tangle optical fibers 1110 without damaging optical fibers 1110. In other words, bundle 1112 is hung over hanger portion 1102 (coming from are 1100) and optical fibers 1110 hang in front of carrier 1100. To assist in can further comprise one or more fiber breakout mounts 1114 adjacent the upper edge of planar surface 1101 for holding a fiber breakout 1116 of bundle 1112 while optical fibers 1110 are being detangled. In depicted implementations, fiber breakout mount 1116 is located on vertical centre line of carrier 1100 just beneath hanger portion 1102, however an exact location of fiber breakout mount 1116 is appreciated to be generally non-limiting. A centre location, however, does allow for optical fibers 1110 to dangle over projections 1114.

For example, bundle 1112 can be hung from hanger portion 1102 such that connectors at the ends of individual optical fibers 1110 are hanging down (in some implementations, they will almost reach the floor under carrier 1100), and can be detangled back to fiber breakout 1116, and grouped, when desired, using a bundle tie (not depicted). Once optical fibers 1110 are detangled (and optionally grouped), bundle 1112 can be removed from hanger portion 1102 and placed in a fiber breakout mount for routing optical fibers 1112 through carrier 1100, as described above. In some implementations such operations can occur for one or more 35-fiber-bundles.

In any event, by providing downwards curved rungs in an optical fiber carrier, that are spaced close together, each of the downwards curved rungs comprising a respective radius that is greater than or equal to a given minimum bend radius of a given optical fiber many different options are provided for storing an excess of the given optical fibers, while preventing stress thereupon. In addition, carrier 100 is enabled for installation in a vertical orientation, as described above such that optical fibers routed there through will not fall off of carrier 100, for example due to the presence of flanges 201.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. An optical fiber carrier for routing given optical fibers from a bundle of the given optical fibers, the given optical fibers having a given minimum bend radius, the optical fiber carrier comprising:
   a planar surface comprising vertical edges;
   downwards curved rungs projecting from the planar surface and vertically aligned between the vertical edges, each of the downwards curved rungs peaking in an upward direction, and comprising a respective radius that is greater than or equal to the given minimum bend radius;
   exit conduits located at the vertical edges, respective exit conduits located between respective adjacent downwards curved rungs, the downwards curved rungs and the exit conduits configured to route an excess of each of the given optical fibers from the bundle, guided by one or more of the downwards curved rungs, and through one of the exit conduits;
   at least one outer vertical channel located between at least one of the vertical edges and the downward curved rings, the at least one outer vertical channel configured to accept the bundle of the given optical fibers;
   at least one fiber breakout mount located within the at least one outer vertical channel, the at least one fiber breakout mount configured to hold a fiber breakout of the bundle, wherein a greater a distance of a given downwards curved rung from the at least one fiber breakout mount, a greater an excess of the given optical fibers the given downwards curved rung can route; and,
   one or more of a cutout and an aperture in the at least one vertical channel and through the planar surface beneath the at least one fiber breakout mount, the one or more of the cutout and the aperture configured to receive the bundle of the given optical fibers from a rear side of the planar surface.

2. The optical fiber carrier of claim 1, wherein a pitch of the downwards curved rungs is one or more of: between about 30 mm and 60 mm; less than about 100 mm; and less than about 200 mm.

3. The optical fiber carrier of claim 1, further comprising at least three fiber breakout mounts in the at least one outer vertical channel, each of the at least three fiber breakout mounts configured to hold a respective fiber breakout of each of three optical fiber bundles.

4. The optical fiber carrier of claim 3, wherein the at least one outer vertical channel is configured to one or more of: guide the bundle of the given optical fibers; mount the bundle of the given optical fibers; and guide the given optical fibers to the downwards curved rungs.

5. The optical fiber carrier of claim 1, further comprising at least one inner vertical channel, adjacent at least one outer vertical channel, configured to guide the given optical fibers from a given downwards curved rung to one or more of a further downwards curved rung and one of the exit conduits.

6. The optical fiber carrier of claim 5, wherein the at least one inner vertical channel is formed by first projections from the planar surface and second projections from the planar surface, the second projections adjacent the outer vertical channel.

7. The optical fiber of claim 6, wherein the first projections comprise at least one edge forming a first side of the at least one inner vertical channel, the at least one edge of a respective first projection located along a radius of one of the downward curved rungs to assist in maintaining the given minimum bend radius of the given optical fibers when looped around the one of the downward curved rungs.

8. The optical fiber of claim 7, wherein the at least one edge is further configured to guide the given optical fibers from the downwards curved rungs to the at least one inner vertical channel.

9. The optical fiber carrier of claim 6, wherein the at least one outer vertical channel is formed by the second projections and third projections from the planar surface, the third projections forming the exit conduits.

10. The optical fiber carrier of claim 1, further comprising upwards curved rungs paired with the downward curved rungs in a one-to-one relationship and aligned therewith, each of the upwards curved rungs comprising a same respective radius as the downwards curved rungs, each respective upwards curved rung located beneath a respective downwards curved rung.

11. The optical fiber carrier of claim 10, wherein a distance between a peak of a given downwards curved rung and a bottom of a given upwards curved rung, associated with another downwards curved rung located beneath the given downwards curved rung, is greater than or equal to about twice the minimum bend radius.

12. The optical fiber carrier of claim 10, wherein pairs of the downwards curved rungs and upwards curved rungs are in the shape of one or more of: an ellipse, an oval, a pointed ellipse, a pointed oval, a mandorla, an intersection of two circles, and a vesica piscis.

13. The optical fiber carrier of claim 1, wherein the downwards curved rungs are formed by one or more of:
   at least one edge of a solid projection, a respective solid projection comprising a respective downwards curved rung and a respective upwards curved rung;
   a ridge; and,
   a plurality of pins.

14. The optical fiber carrier of claim 1, further comprising respective guide conduits horizontally aligned with respective exit conduits, and each of the respective guide conduits are located between respective horizontal ends of adjacent downwards curved rungs.

15. The optical fiber carrier of claim 14, further comprising projections from the planar surface forming the respective guide conduits, an outer edge of each of the projections located along a radius of one of the downward curved rungs to assist in maintaining the given minimum bend radius of the given optical fibers when looped around the one of the downward curved rungs, the outer edge further configured to assist in guiding the given optical fibers from a given downwards curved rung to an inner vertical channel.

16. The optical fiber carrier of claim 1, further comprising flanges configured to prevent the given optical fibers from sliding off a respective downwards curved rung when the optical fiber carrier is installed in a vertical orientation.

17. The optical fiber carrier of claim 1, further comprising a hanger portion extending from an upper edge of the planar surface, the hanger portion being curved at a radius that is about greater than or equal to the given minimum bend radius such that the bundle can be hung over the hanger portion to detangle the given optical fibers.

18. The optical fiber carrier of claim 17, further comprising one or more fiber breakout mounts adjacent the upper edge configured to hold a fiber breakout of the bundle while the given optical fibers are being detangled.

* * * * *